United States Patent [19]
Kintzel et al.

[11] Patent Number: 4,510,829
[45] Date of Patent: Apr. 16, 1985

[54] CLAMPING DEVICE FOR TOOL ASSEMBLIES

[75] Inventors: Gerhard Kintzel; Edmund Heilmann, both of Schweinfurt, Fed. Rep. of Germany

[73] Assignee: SKF Kugellagerfabriken GmbH, Schweinfurt, Fed. Rep. of Germany

[21] Appl. No.: 446,398

[22] Filed: Dec. 2, 1982

[30] Foreign Application Priority Data

Dec. 24, 1981 [DE] Fed. Rep. of Germany ....... 3151275

[51] Int. Cl.³ .......................................... B23B 29/08
[52] U.S. Cl. ..................................................... 82/36 R
[58] Field of Search ................. 82/36 R, 25, 37, 24 R; 407/8–10, 76, 77, 92, 120, 88, 95, 96, 67–70

[56] References Cited

U.S. PATENT DOCUMENTS

| | | | |
|---|---|---|---|
| 2,065,966 | 12/1936 | Bruning | 407/10 |
| 2,293,006 | 8/1942 | Luers | 407/88 |
| 2,293,999 | 8/1942 | Redinger | 82/37 |
| 2,553,699 | 5/1951 | Brodin | 407/10 |
| 2,585,487 | 2/1952 | Moore | 407/86 |
| 2,877,536 | 3/1959 | Monosmith | 407/71 |
| 2,900,704 | 8/1959 | Sweet | 407/88 |
| 3,078,547 | 2/1963 | Sweet | 407/69 |
| 3,575,072 | 4/1971 | Silver et al. | 82/36 R |
| 3,677,115 | 7/1972 | Skrentner | 82/24 R |
| 3,830,586 | 8/1974 | Trevarrow | 407/120 |

Primary Examiner—Leonidas Vlachos
Assistant Examiner—Jerry Kearns
Attorney, Agent, or Firm—Eugene E. Renz, Jr.

[57] ABSTRACT

A tool assembly comprising a support base having a plurality of longitudinally oriented guideways disposed next to one another in a common clamping plane and at least one tool holder which is adjustably mounted along the guideways and can be secured in the guideways by clamping means, characterized in that the guideways are formed by a plurality of rib-like projections in the base defining a series of grooves arranged in at least two groups at each end of the support base and the clamping means are formed by at least one holding projection of the tool holder which engages in a groove of the two groups whereby the holding projections of the one group and the holding projections of the other group are arranged mutually adjustable to one another by adjusting means against the sidewalls forming the grooves in the base.

8 Claims, 6 Drawing Figures

CLAMPING DEVICE FOR TOOL ASSEMBLIES

BACKGROUND AND SUMMARY OF THE INVENTION

The present invention relates to improvements in clamping devices for tools particularly turning tools or lathes which include a support base having a plurality of guideways and at least one tool holder which is adjustable in the guideways and can be fixed in a predetermined position on the base by clamping means.

In accordance with a known prior art clamping arrangement, the guideways on the support base are in the form of a plurality of rods and the tool holder base has bores through which the rods extend to permit adjusting movement of the tool holder relative to the base. Cup springs placed on the rods and elastically pressing against the tool holder provide clamping means as well as a fine adjustment device for moving the tool holder against the cup springs. For stability purposes, the bores in the tool holder base through which the rods pass must be machined very accurately so that the tool holder can be moved directionally on the guides without much play and finally be secured in place in a desired predetermined position. Even with close tolerances, it has been found that excessive play developes between the rods and the complementary support bores of the tool holder over a period of time due to sliding wear. This play which develops over a period of use is particularly harmful in tool holders for turning bits or the like since it produces vibrations and undesirable chatter marks when turning a work piece to be machined.

With the foregoing in mind, it is an object of the present invention to provide an improved clamping arrangement for tools of the above mentioned type which is characterized by novel features of construction and arrangement facilitating adjustment of the tool holder on the support base in a very simplified manner wherein the holder can be locked firmly to the support base without play thereby eliminating vibrations and the deleterious chatter which produce the undesirable chatter marks on a finished workpiece. These features and advantages are provided in a device which is relatively easy and economical to manufacture. To this end, the base is provided with a plurality of guideways in the form of a series of elongated spaced side-by-side ribs which define a series of elongated grooves between the adjacent ribs. The tool support has a series of projections which engage in the grooves of the base and includes adjusting means operatively associated with the tool holder for effecting relative displacement of the projections in the grooves to effect firm pressure applying relation between the two when it is desired to fix the tool holder in a predetermined position on the base. Thus, the present invention provides an assembly wherein the tool holder can be adjusted over a wide range of positions on the base and locked in place by simple means providing an adjusting force between the grooves and projections so that the tool holder is mounted on the base without play and with a high rigidity.

More specifically, the support base is provided with a plurality of longitudinally oriented guideways arranged side by side in a common clamping plane arranged in two groups at opposite ends of the support base. The ribs at each end are preferably disposed angularly relative to one another and to the support base. Clamping means comprises at least one projection on the tool support which engages in a groove of the two groups of grooves in the base so that the projections of the groups are arranged mutually adjustable relative to one another by adjusting means against the wall of its respective groove in the base. The tool holder consists of a main section, an adjusting section, each having groups of projections complementing the groups of guideways in the base, the main section and the adjusting section being flexible in a cross direction and including means in the form of a screw member between the main section and the adjusting section actuatable in a predetermined manner to press the projections into pressure applying relation with the ribs on the base defining the grooves when it is desired to anchor or fix the tool in a predetermined position on the base.

By this construction, the tool holder may be adjusted step wise in a cross direction on the support base simply by slipping the holding projections into different grooves in the base of the respective groups of grooves. Additionally, the tool holder is infinitely adjustable in a longitudinal direction simply by moving its holding projections in the appropriate grooves of the support base. After longitudinal and cross direction adjustments of the tool holder, it may be locked in place by means of the adjusting means on the support base simply by actuating the adjusting screw member. In this fashion the holding projections of the main section of the tool holder which engage in one group of grooves in the support base are mutually adjusted and locked in relation to the holding projections of the adjusting section of the tool holder which engage in the other group of grooves.

In the preferred embodiment of the invention, the sidewalls of the projections defining the grooves of the two groups extend at an acute angle diagonally toward the opening of the grooves and the holding projections of the tool holder are disposed in a predetermined manner to be supported in the base of the grooves of the support base or on the outside surface of the support base located between the openings of the grooves It has been found that by this arrangement a particularly reliable clamping action of the tool holder on the base is produced since the holding projections either are supported with their end surfaces in the base of the grooves of the support base or the outside surfaces located between the openings of the grooves. In this way during mutual adjustment of the holding projections, a force component results at the bevelled inside and outside walls defining the grooves between the tool holder and the support base oriented in a cross direction to the clamping plane. By reason of this force component, the holding projections are locked into the grooves or the outside surface of the base plate into the groove between the holding projections.

By constructing the tool holder of a main part and an adjusting part connected by a flexible connecting or bridging section, the tool holder is of comparatively simplified construction which can be made and assembled rather economically.

In accordance with one embodiment of the invention, the adjusting screw member is connected solidly with the main section of the tool holder fitted in the adjusting part oriented perpendicular to the grooves in the base. In accordance with another embodiment, the adjusting means are formed by a hydraulically activated movable adjusting plug mounted in the adjusting part of the tool holder perpendicular to the grooves and which is closely connected with the main section of the tool holder. This type of adjusting means is of rather simplified design and lends itself to automatic adjustment or an automatic tool holder exchange on the support base.

The cross section of at least one of the holding projections of the tool holder is preferably of a size and shape closely complementing the cross section of the mating grooves in the support base with little play in a transverse direction as well as in a direction perpendicular to the clamping plane so that the tool holder is held in place when assembling or slipping them in their holding projections and during subsequent longitudinal movement in the appropriate grooves when disassembling it from the support base.

In accordance with a feature of the invention, the holding projections are of rib-shaped configuration having flat side surfaces directly confronting the flat or planar sidewalls of the ribs defining the grooves in the base to provide large contact surfaces when locking the tool holder in place.

BRIEF DESCRIPTION OF THE DRAWINGS

These and other objects of the present invention and the various features and details of the operation and construction thereof are hereinafter more fully set forth with reference to the accompanying drawings wherein.

DESCRIPTION OF THE PREFERRED EMBODIMENTS

Figure 1:
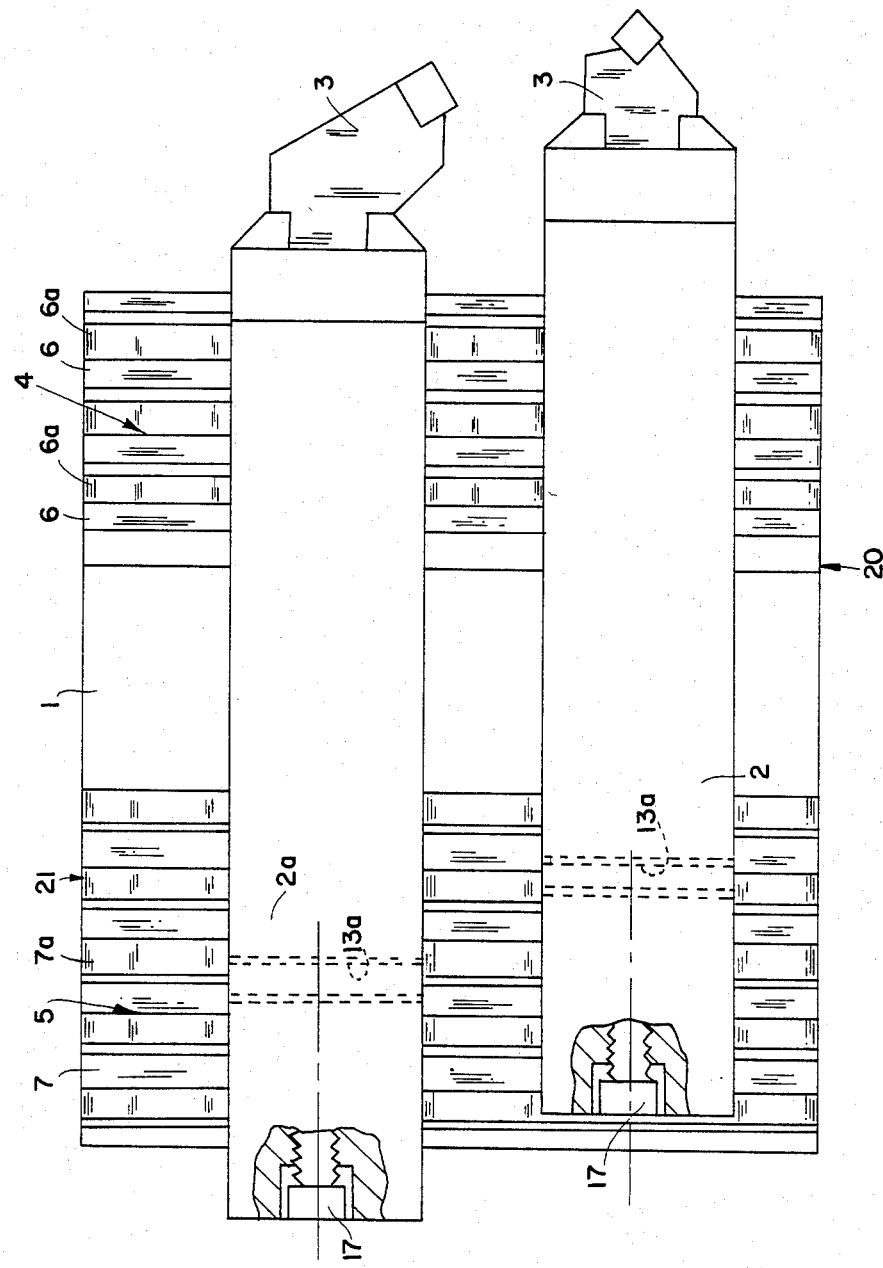
FIG. 1 is a plan view of a clamping arrangement for tools in accordance with the present invention.
Figure 2:
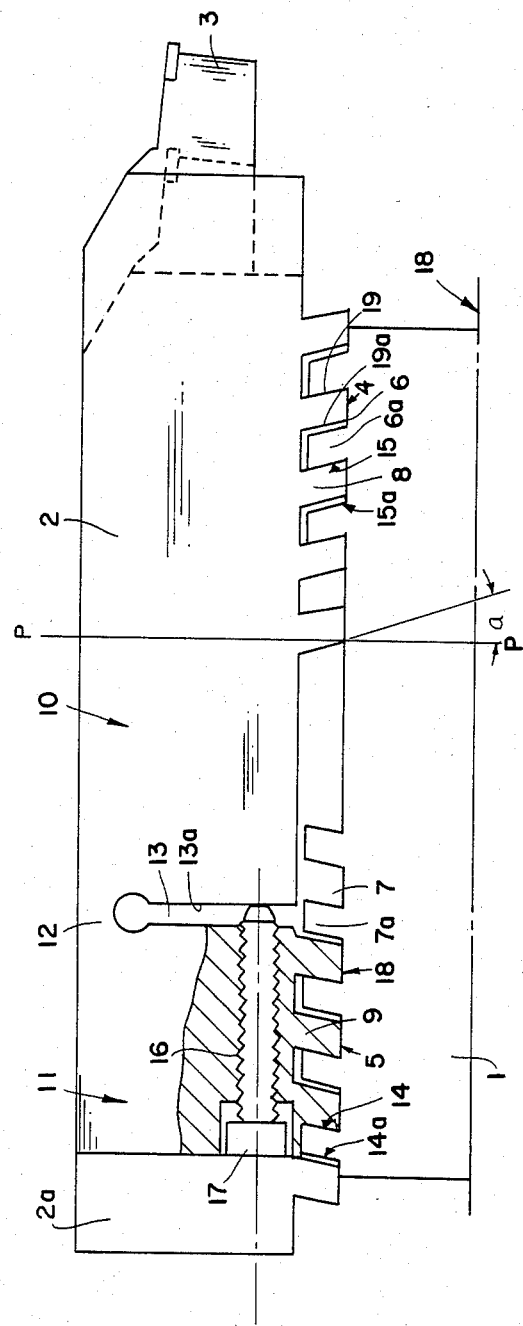
FIG. 2 is a side elevational view thereof with parts shown in section to illustrate the clamping action more clearly.

Referring now to the drawings and particularly to FIGS. 1 and 2 thereof, there is shown a tool holder incorporating a novel clamping arrangement in accordance with the present invention. As illustrated therein, the assembly includes a support base 1 and, in the present instance, a pair of tool holders 2 mounted on the common support base 1, each tool holder 2 carrying a turning bit tool 3 at one end thereof. A series of longitudinally extending grooves are formed in one face of the support base 1 which as illustrated extend parallel to one another in a longitudinal direction and in the present instance are arranged in two spaced groups at opposite lateral ends of the support base, the grooves 6 at one lateral end forming a group designated by the numeral 4 and the grooves 7 at the opposite lateral end forming a group designated by the numeral 5. In the present instance the grooves of each group are equispaced relative to one another a small distance. As best illustrated in FIG. 2, the grooves in the base are defined by a series of elongated spaced ribs 6a, 7a having generally parallel side faces which in the present instance are disposed at a small acute angle α to a vertical plane P—P extending transversely to the base 1. Note that the ribs 6a, 7a and therefore the grooves in each group 4 and 5 of the base project upwardly at small acute angles directed toward the plane P—P and form first guideways.

Each tool holder is provided with rib-shaped locking projections 8 and 9 which are arranged in groups at opposite ends of each tool holder as illustrated in FIG. 2. Each tool holder 2 consists of a main section 10 supporting the turning bit tool 3 and a clamping section 11 connected in a flexible adjustable manner to the main section in the cross direction. As illustrated, the series of rib-shaped locking projections 8 of the main section 10 are angularly oriented and spaced a predetermined distance relative to one another to engage in the grooves 6 in the support base comprising the group 4 adjacent the end thereof mounting the turning bit. The clamping section 11 likewise has a series of angularly projecting generally parallel rib-like projections 9 adapted to engage in the groove 7 of the group 5 in the support base 1. The grooves and rib-like projections of the tool holder define second guideways. The main section and clamping section of the tool holder are divided by a cross groove 13 of keyhole cross section which is open downwardly towards the grooves in the support base and defines a connecting bridge 12 of relatively small cross section so that the main and adjusting sections of the tool holder are flexible in the cross direction. Adjusting means are provided between the main and adjusting sections of the tool holder which bridges the keyhole slot 13 and is operable to effect longitudinal displacement of the two sections by reason of the flexibility of the connecting bridge 12 thereby to effect clamping interengagement of the rib-like locking projections 9 of the tool holder against the sidewalls of the grooves formed in the base so that the tool holder may be clamped or fixed in a predetermined position on the base simply by actuating the clamping means. In the illustrated embodiment, the clamping or tightening means comprises a pressure screw member 17 which is adjustably mounted in a threaded bore 16 in the adjusting section 11 of the tool holder which opens into the keyhole slot 13. Thus, by turning the screw 17 into the threaded bore 16, the inner terminal end of the pressure screw engages the flat surface of the main section bordering the keyole slot 13 whereby the connecting section is strained elastically and bent outward at the connecting bridge 12.

As illustrated, the grooves 6, 7 of the support base 1 lie in a common clamping plane 18 and the parallel inner and outer sidewalls 14, 14a of the grooves 7 in group 5 and the parallel inner and outer sidewalls 15, 15a of the grooves 6 of group 4 run diagonally toward each other at a sharp angle. Further the cross section of all the rib-like locking projections 8 and 9 of the tool holder are closely matched to the grooves in the support base which complement them or mate in such a way that the tool holder is held in place in the groove 6 and 7 of the support base even in the loose condition of the locking projections 8 and 9 in a direction perpendicular to the clamping plane 18 as well as in the cross direction with little play.

In the present instance, the rib-like projections 8 and 9 have parallel lateral side surfaces 19, 19a, which confront the planar sidewalls 14, 14a and 15, 15a, of the grooves 6 and 7 in the support base 1. In the present instance the grooves extend for the full width of the base and the locking projections extend continuously crosswise of the tool holder so that the tool holders may be slipped in from one side of the base 20 or from the opposite side 21 of the support base. In this way each of the tool holders may be mounted in a predetermined cross position with its locking projections 8 and 9 engaging in the grooves and shifted along the grooves of the support base until they are located in a predetermined desired position on the base. Additionally, it is possible to fasten one or both tool holders in a position turned 180° on the support base which may, for example, be a revolving head.

Consider now briefly the procedure for mounting tool holders on a base incorporating the clamping means in accordance with the present invention. With the locking screw 17 backed off so that the main and clamping section are in the normal relaxed position, the rib-like projections 8 and 9 of the tool holder align with the grooves 6 and 7 in the base and thus the tool holder may be slid onto the base from either opposite end 20 or 21. Note that the plurality of projections and grooves in each group affords a degree of adjustment in a crosswise direction. For example, as illustrated in FIG. 1, the tool holder 2a is staggered in a crosswise direction relative to the tool holder 2. When the tool holders have been positioned in a predetermined cross position, the adjusting screw 17 is simply turned inwardly so that its tip engages the flat section 13a defining the cross slot 13 which produces a pivoting action of the main and adjusting section about the connecting bridge 12 whereby as illustrated in FIG. 2, the outer side surfaces 19 of rib-like projections 8 and 9 of the main section 10 bear against and in pressure-applying relation with the confronting inner side walls 14, 15 of the base grooves 6, 7. This pressure applying relation between the interengaging surfaces of the rib-like projections of the tool holder and grooves of the base firmly and rigidly supports the tool holder in the desired operating position without play and in turn eliminates the vibrations and undesirable chatter marks characteristic of the prior art. Relocation or disassembly of the tool holder is comparatively simple. The clamping screw 17 is simply backed off to ease or release the tension at the connecting bridge 12 so that the main and adjusting sections of the tool holder spring back to their normal position whereby the pressure relation of the side surfaces of the projections and the sidewalls of the grooves is relaxed and the tool holder may be easily moved relative to the base to completely remove it or simply to adjust it.

Figure 3:
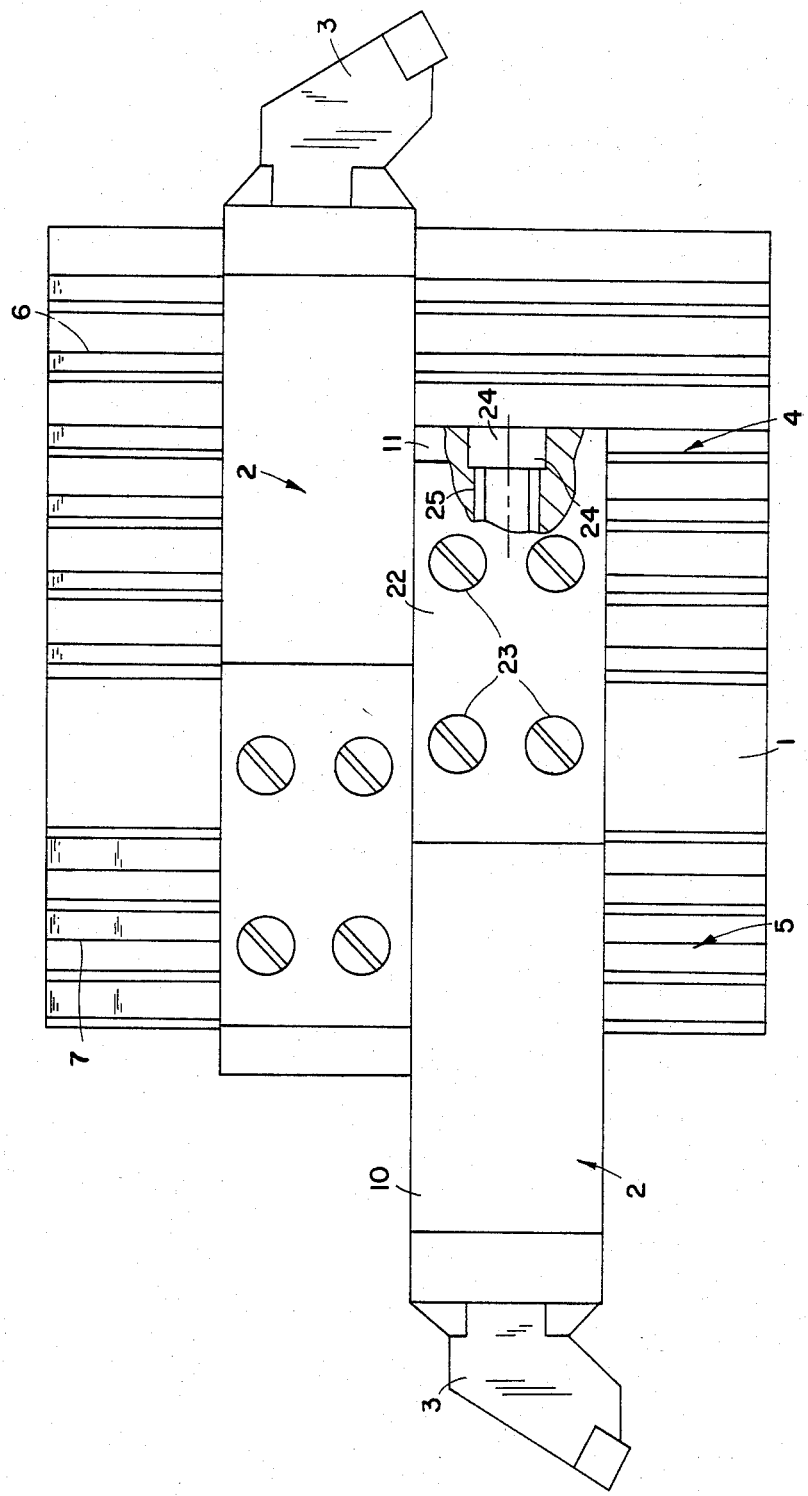
FIG. 3 is a plan view of a modified clamping arrangement for tools in accordance with the present invention.
Figure 4:
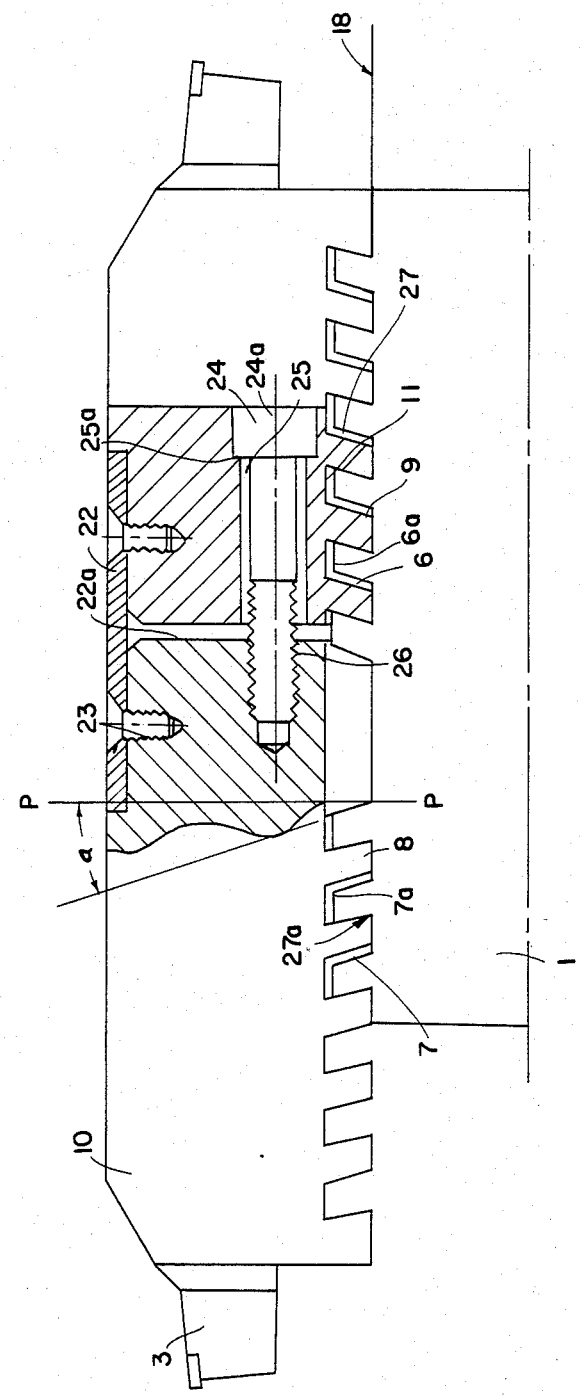
FIG. 4 is a side elevational view of the embodiment shown in FIG. 3 partially in section to expose parts of the assembly for better understanding.

There is illustrated in FIGS. 3 and 4 a modified clamping assembly for a tool holder which is generally similar in overall arrangement to that shown in FIGS. 1 and 2. Thus, each tool holder consists of a main section 10 mounting a turning bit 3 and an clamping section 11 connected to it in a flexible manner. In the present instance the main section and the clamping section are not formed integrally and are secured together by a sheet metal section 22 made of hardened spring steel which as illustrated bridges and connects these sections in spaced-apart relation to define a groove 22a therebetween. The sheet metal section 22 is fastened with screws 23 to the outer surface of the main part 10 and the adjusting section 11. A tension screw 24 serves as a clamping or tightening means and engages in an enlarged bore 25 in the adjusting section 11 and an aligned threaded bore 26 of the main section 10. The tension screw 24 has an enlarged head 24a which engages a peripheral shoulder 25a formed in the bore 25 at the front end of the main section 11 to facilitate the clamping section when the screw 24 is turned into the threaded bore 26.

The ribs 6a, 7a defining the grooves 6 and 7 in the base are also angularly disposed relative to a plane P—P extending transversely to the base. However, in this instance the ribs are directed outwardly at a small acute angle away from the plane P—P and the rib-like projections 8 and 9 of the tool holder project inwardly at an angle towards one another to register in the grooves 6 and 7 of the base. The tool holder is positioned on the base in much the same manner as the previously described embodiment. However, now when it is desired to clamp the tool holder in a predetermined position on the base, the tension screw 24 is tightened or turned into the threaded bore 26 whereby the sheet metal section 22 is strained in bending. As a result, the inner side surfaces of the locking projections 9 are tightened against the inner sidewalls 27 of the grooves 6. At the same time the inner side surfaces of the locking projections 8 of the main section are pressed against the inner sidewall 27a of the groove 7 of the group comprising the group 5. By this arrangement, the locking projections 8 and 9 of the tool holder are held in place by the support base under oppositely directed tension. The inside walls 27, 27a of the grooves 6 and 7 respectively in this case run at a sharp angle diagonally to the opening of the grooves 6 and 7 so that the flat planar side surfaces of the locking projections 8 and 9 of the tool holders are supported in the flat base of the grooves 6 and 7 which lie in the clamping plane 18. Note that the projections 8 and 9 are of a greater height than the ribs defining the grooves in the base to provide this clamping action as in the FIG. 1 embodiment.

Figure 5:
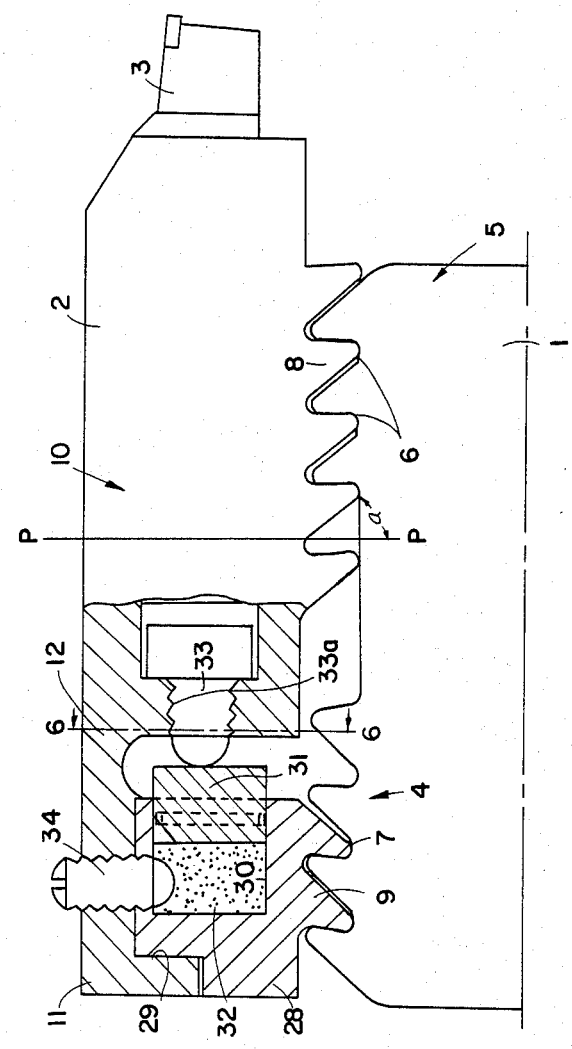
FIG. 5 is a side elevational view partly in section of a further modified clamping device for tools in accordance with the present invention.
Figure 6:
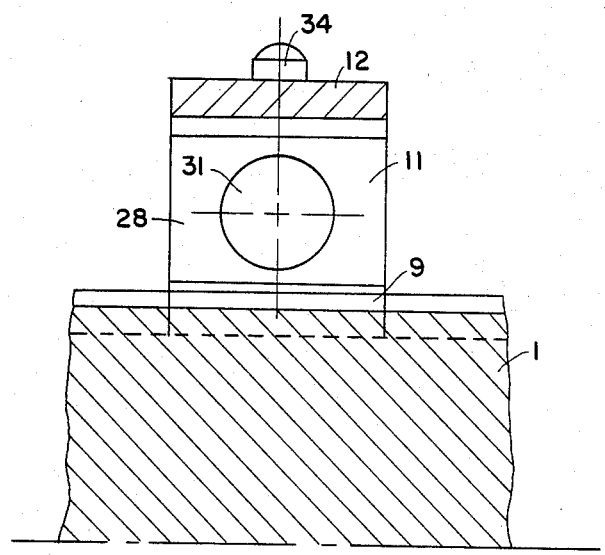
FIG. 6 is a sectional view taken on lines 6—6 of FIG. 5.

FIGS. 5 and 6 show a further modified clamping device for tools in accordance with the present invention. The tool holder 2 which carries the turning bit 3 is generally similar to the previously described embodiment and consists of a main section 10, and clamping section 11 and a connecting part or bridge 12 connecting the main and adjusting sections integrally in a flexible relationship. The base is provided with a series of grooves and the main and adjusting sections are likewise provided with rib-like projections which engage in the grooves to permit adjusting movement of the tool holder on he base and clamping in a predetermined position when desired. In this instance, however, the grooves 6 and 7 arranged in groups 4 and 5 on the support base are of saw-tooth shape in cross section. As illustrated, the holding or locking projections 8 of the tool holder engage in the grooves of group 5 in the support base 1 and the locking projections 9 of the tool holder likewise engage in the groove 7 of group 4 in the support base. The grooves 6 and 7 run at an acute angle and extend towards a plane P—P extending transversely to the base.

In accordance with this embodiment of the invention, an insert 28 is provided in the adjusting section 11 which is supported outwardly against a shoulder surface 29 thereof. A bore 30 is formed in the insert 28 which may be machined and which is closed off inwardly by a cylindrical adjusting plug 31 which slides snugly in the bore. A closed cavity 32 is formed, therefore, between the plug 31 and base of the bore 30 which is completely filled with a hydraulic medium under pressure, for example, oil, grease or tar. The main section 10 is provided with a threaded bore 33a in the main section facing the adjusting plug to receive an adjusting screw 33 which as illustrated engages the adjusting plug at its outer terminal end.

Consider now mounting of a tool holder on a base in accordance with this embodiment of the invention. When attaching the tool holder 2 in the grooves 6 and 7 of the support base 1, the set screw 34 is tightened far enough into the cavity 32 and in this way high hydraulic pressure is formed in the cavity 32 which urges the adjusting plug 31 against the end of the adjusting screw 33. By reason of the corresponding compressive forces between the adjusting plug 31 and the adjusting screw 33, the connecting part or bridge 12 is deformed in a flexible manner. By reason of this action, the locking projections 9 are pressed against the inner walls of the grooves 6. By reason of this a zero play and tight locking of the tool holder on the support base is provided.

While particular embodiments of the present invention have been illustrated and described herein, for example, the adjusting section of the tool holder may be connected with a hydraulic line communicating with the cavity 32 of the adjusting section 11 of the embodiment shown in FIGS. 5 and 6. In this way the tool holder can be hydraulically released or clamped on its support base in operation by means of a suitable pressure control means on the outside of the clamping device.

Further, instead of the projections 8 and 9 of the tool holder being supported and bottoming on the base of the grooves 6 and 7 in the support base, the grooves and projections may be of a predetermined projection height relative to one another so that the rib-like projections of the base defining the grooves are supported on the base surface between the locking projections 8 and 9 of the tool holder.

SUMMARY

A clamping device for tools consists of a support base (1) with several longitudinally oriented guideways arranged next to each other in a common clamping plane (18) and at least on tool holder (2) which can be adjusted along these guideways and fixed by clamping means in the guideways.

In order to be able to adjust the tool holder (2) with simple means and clamp it always free of play on the support base (2), the guideways are formed as a group of grooves (6, 7) machined at a slight mutual distance from each other in the support base (1) arranged at each of the two ends of the support base (1) and the clamping means is formed each time by at least one locking projection (8,9) of the tool holder (2) engaging in a groove (6, 7) of the two groups. The locking projections (8, 9) of the one group are arranged mutually adjustable in relation to each other by adjusting means (17) against the inside or outside wall (14, 15) of the appropriate groove (6, 7). (FIG. 2)

What is claimed is:

1. A tool assembly comprising a tool, a support base (1) having first guideways formed by at least two groups of spaced first rib-like projections (6a, 7a) and grooves (6, 7) disposed at an oblique angle relative to the base and extending generally transversely to the feed direction of said tool, at least one tool holder (2) mounted on the base (1) having a main section (10) and a clamping section (11), means securing said tool to said main section, complementary second guideways formed by a series of spaced second rib-like projections (8, 9) complementing the first rib-like projections and interengageable therewith, said second rib-like projections (8, 9) projecting from said main section and clamping section, means (12, 22) to allow limited relative movement of said main section and clamping section and actuator means (16, 26, 33) operable to effect said relative displacement of said main section and clamping section and thereby displacement of said second rib-like projections in a direction generally parallel to the base to effect pressure applying relation of said second rib-like projections of the tool holder and at least some of said first rib-like projections of the base so that the side faces of the ribs interengage in a manner providing a clamping component between the interengaging ribs of said first and second guideways.

2. A tool assembly as claimed in claim 1, characterized in that the inside or outside wall, respectively (14, 15, 27, 27a), of the grooves (6, 7) of the two groups (4, 5), running at an acute angle diagonally toward the opening of the grooves (6, 7) and the holding projections (8, 9) of the tool holder (2) are arranged to be supported in the base of the appropriate groove (6, 7) of the support base (1) or the outside surfaces of the support base (1) located between the openings of the grooves (6, 7) are arranged to be supported in the base between the holding projections (8, 9) of the tool holder (2).

3. A tool assembly as claimed in claim 1 characterized in that the tool holder (2) consists of said main section (10) holding said tool (3) carrying the holding projection(s) (8, 9) for the one group (4, 5) of grooves (6, 7) of the support base (1) and clamping section (11) connected with the main part (10) in a flexible relationship in the cross direction, carrying the holding projection(s) (8, 9) for the other group (4, 5) of grooves (6, 7) and the actuating means (16, 24, 31) acting in cross direction between the main section (10) and the clamping section (11) are arranged to press the clamping section (11) with its holding projection(s) (8, 9) against the inside or outside wall, respectively (14, 15, 27, 27a), of the grooves (6, 7) of the other group (5, 4).

4. A tool assembly as claimed in claim 3, characterized in that the actuating means are formed by a screw (17, 24) connected solidly with the main section (10) of the tool holder (2), fitted in the clamping section (11) of the tool holder (2), oriented perpendicular to the grooves (6, 7).

5. A tool assembly as claimed in claim 3, characterized in that the actuating means are formed by a hydraulically activated movable adjusting plug 31, fitted in the clamping section (11) of the tool holder (2), perpendicular to the grooves (6, 7) and which is closely connected with the main section (10) of the tool holder (2).

6. A tool assembly as claimed in claim 1, characterized in that the cross section of at least one of the holding projections (8, 9) of the tool holder (2) is adapted closely in shape with little play to the cross section of the mating grooves (6, 7) of the support base (1) in transverse direction as well as in the direction perpendicular to the clamping plane (18).

7. A tool assembly as claimed in claim 1, characterized in that each holding projection (8, 9) is constructed rib-shaped with a flat surface (19) lying directly across from the likewise flat inside or outside wall, respectively (14, 15, 27, 27a), of the mating groove (6, 7) of the support base (1).

8. A tool assembly as claimed in claim 1 wherein one group of first rib-like projections is angularly disposed in one direction relative to a plane transverse to the base and the first rib-like projections in the other group are oppositely angularly disposed.

* * * * *